Figure 1:
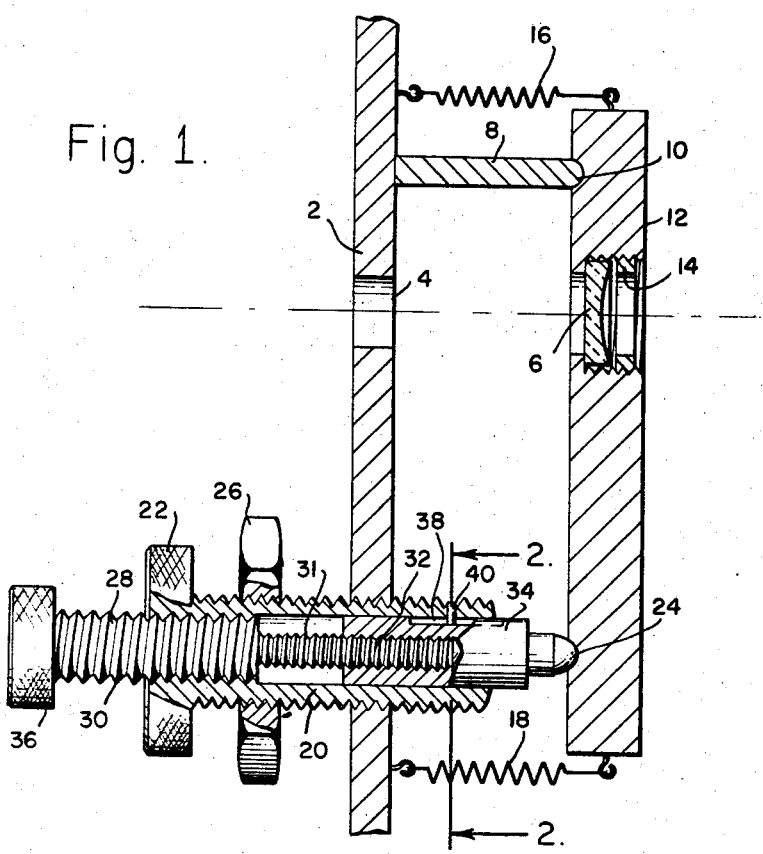

Sept. 24, 1968 R. H. NEUSEL ET AL 3,402,613
DIFFERENTIAL SCREW WITH VARIABLE ADJUSTMENTS
Filed Aug. 1, 1966

Gordon J. Hunt,
Robert H. Neusel,
INVENTORS.
BY.

Donald W. Graves
ATTORNEY.

3,402,613
DIFFERENTIAL SCREW WITH VARIABLE ADJUSTMENTS
Robert H. Neusel, Palos Verdes, and Gordon J. Hunt, Redondo Beach, Calif., assignors to TRW Inc., Redondo Beach, Calif., a corporation of Ohio
Filed Aug. 1, 1966, Ser. No. 569,365
3 Claims. (Cl. 74—89.15)

This invention relates to a differential screw with variable adjustments.

More particularly this invention relates to an adjusting mechanism which has both coarse and fine adjustments within the same assembly.

There are many examples in the prior art which have a need for an adjusting mechanism which can either provide a coarse adjustment or a fine adjustment depending on the situation. One of the prime examples illustrating the need for both coarse and fine adjustment of mirrors provided at both ends of a laser cavity. This is particularly the case with a gas laser system. As is well known, the term "laser" stands for light amplification by stimulated emission of radiation. In the gas laser, radiation is reflected back and forth between mirrors at each end of a laser cavity. In order that a coherent beam be emitted in the proper manner, it is necessary that the orientation of the normal to the mirrors be as parallel as possible. To obtain this, the mirrors typically are pivoted at one side through a housing and an adjustment provided on the other side as more fully brought out in Electronics Magazine, Oct. 27, 1961, pages 45 and 46. A differential screw mechanism is usually provided which, in essence, is a fine pitch mechanism for tuning the mirror to its proper position. The difficulty with this type of mechanism is that a coarse adjustment is not provided such that many turns of the differential screw must be made in order to bring the mirror into proper position for fine adjustment. A similar mechanism, although having a different application, is disclosed in American Machinist Magazine, dated May 19, 1958, page 139. This mechanism likewise lacks a coarse adjustment.

This invention obviates many of the problems of the prior art examples in that both a fine and coarse adjustment is provided in a compact assembly. A particular application of this invention is in the adjustment of laser mirrors.

Briefly, the invention comprises a longitudinal member having exterior threads thereon which is adapted to be threadably mounted in a housing member for movement therein. Mounted on the longitudinal member or screw is a lock member, whereby the member can be secured against rotation. Within the longitudinal member or screw is a second screw member which is threaded within the first screw and which further has a longitudinal member which is slidable within the first longitudinal member. Upon rotation of the first member, the coarse adjustment can be made. The first member can then be locked against rotation and the interior member screwed within the first member such that a fine adjustment can be made.

Figure 2:
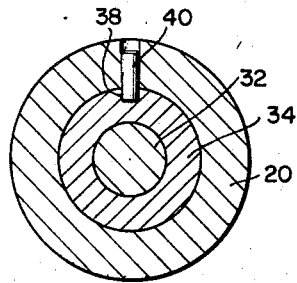

The objects and advantages of this invention will become apparent as this description proceeds taken in conjunction with the drawing in which:

FIGURE 1 is a view, partially in cross section, of the variable adjustment device according to this invention, and FIGURE 2 is cross sectional view as viewed along line 2—2 of FIGURE 1.

Referring now to FIGURE 1, there is shown an apparatus constructed according to this invention. A housing or wall is shown at 2 and may, for example, comprise a portion of a laser device. An aperture 4 is provided for the passage of light through reflecting mirror 6 of a laser device. A support 8 is rigidly or integrally attached to wall 2 and a rounded or pointed portion thereof 10 is provided such that a movable member 12 may pivot thereabout. Mounted within member 12 is a retainer 14 which is threadably secured in retainer 12. This retainer serves to hold mirror 6 in proper position. A spring 16 is provided to force member 12 against support 8. In a similar manner, spring 18 is provided at the other end of member 12.

Threadably received within wall or housing 2 is a first longitudinal member 20. Upon rotation of knurled knob 22 which is formed integrally with longitudinal member 20, member 20 may be screwed into or out of housing or wall 2 so as to pivot member 12 through pivot point 24 about pivot 10. This changes the orientation of mirror 6 relative to a laser device not shown and to aperature 4. Member 20 has relatively coarse thread such that upon rotation thereof, a fairly rapid advancement or retraction of member 20 within housing 2 is accomplished per revolution of knurled knob 22. Threadably received on longitudinal member 20 is a lock or stop nut 26. When this member is advanced so as to be forced against housing or wall 2, rotation of member 20 is prevented.

Threadably received within longitudinal member 20 is a second longitudinal member 28. Shown on member 28 are threads 30 which are received within complementary threads on the interior of longitudinal member 20. A longitudinal portion of member 28 is shown at 32 which has threads 31 oriented in the same direction as threads 28 but of a different pitch. In practice, the pitch of the threads on portion 32 is smaller than the pitch of threads 30.

A third longitudinal member 34 has interior threads thereon for reception of threads 31 of member 28. When member 28 is turned by means of knurled knob 36, member 28 will advance through longitudinal member 20 while at the same time member 34 is moved in the opposite direction but a smaller rate, such that the net result of turning knob 36 is to advance member 34. Member 34 is prevented from rotating within member 20 by means of a slot or groove 38 within member 34 (see FIG. 2). Longitudinal member 20 has a pin 40 which is slidable within groove 38 such that rotation of 34 relative to member 20 is prevented.

In operation, a coarse adjustment of member 12 and hence mirror 6 is made by rotation of knurled knob 22. When a position close to that desired is obtained, lock nut 26 is then advanced so as to be forced against wall 2, thus preventing rotation of member 20 relative to housing or wall 2. A fine adjustment is then accomplished by rotation of knurled knob 36, thus forcing member 28 to the right or to the left as desired. The fine adjustment is accomplished by the differential screw mechanism which represents the difference in pitch of threads 30 and threads 31. Member 34, when knurled knob 36 advances member 28 to the right as viewed in the drawing, will move to the left but at a slower rate, resulting in a net movement to the right as viewed in the figure. The advantage of providing the differential pitch arrangement is that it is extremely difficult to form the necessary fine pitch for fine adjustment.

Although not shown, a second variable adjustment screw assembly can be provided so that adjustments in the orthogonal direction can be made.

Having described this invention, it is to be understood that it is to be limited only by the scope of the claims appended hereto.

What is claimed is:
1. A differential screw with variable adjustments which comprises;

a first longitudinal member, said member having threads on the exterior thereof and a longitudinal bore therethrough, said bore being threaded on a portion thereof whereby to receive an exteriorly threaded member, a second longitudinal member, said second member having a first portion with exterior threads thereon received by the threaded bore of said first member, said second member having a second portion with exterior threads thereon, said threads having a pitch different from that of the threads on said first portion, a third longitudinal member having interior threads thereon corresponding to the threads on said second portion of said second member and slidable axially within said first member when said second member is rotated relative to said first member, and means to prevent rotation of said third member relative to said first member, whereby rotation of said first member within a correspondingly threaded structure will move said first member, second member and third member a predetermined axial distance for each revolution of said first member and rotation of said second member relative to said first member will move said third member a second predetermined distance for each revolution of said second member.

2. A differential screw according to claim 1 wherein locking means are provided on said first member adapted to prevent rotation of said first member.

3. A differential screw according to claim 1 wherein said means to prevent rotation of said third member relative to said first member comprises a pin slidable within a slot.

References Cited

UNITED STATES PATENTS 3,204,471  9/1965  Remdel _____ 74—89.15
3,281,944  11/1966  Youngblood _____ 33—163

FRED C. MATTERN, JR., *Primary Examiner.*

F. D. SHOEMAKER, *Assistant Examiner.*